(12) United States Patent
Cha et al.

(10) Patent No.: US 10,840,526 B2
(45) Date of Patent: Nov. 17, 2020

(54) METHOD AND APPARATUS FOR EVALUATING MOVEMENT TENDENCY OF IONS IN ELECTROLYTE MEMBRANE

(71) Applicants: HYUNDAI MOTOR COMPANY, Seoul (KR); KIA MOTORS CORPORATION, Seoul (KR)

(72) Inventors: Jin Hyeok Cha, Suwon-si (KR); Suk Hwan Yun, Yongin-si (KR); Woong Pyo Hong, Yongin-si (KR); Sun Bo Shim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 147 days.

(21) Appl. No.: 16/197,183

(22) Filed: Nov. 20, 2018

(65) Prior Publication Data

US 2020/0036022 A1    Jan. 30, 2020

(30) Foreign Application Priority Data

Jul. 30, 2018  (KR) .................. 10-2018-0088839

(51) Int. Cl.
*H01M 8/04*     (2016.01)
*H01M 8/0444*   (2016.01)
(Continued)

(52) U.S. Cl.
CPC ..... *H01M 8/04477* (2013.01); *H01M 8/1004* (2013.01); *H01M 8/1023* (2013.01); *H01M 8/1032* (2013.01); *H01M 8/1067* (2013.01)

(58) Field of Classification Search
CPC .......... H01M 8/04477; H01M 8/1004; H01M 8/1023; H01M 8/1032; H01M 8/1067;
(Continued)

(56) References Cited

U.S. PATENT DOCUMENTS

2017/0005354 A1* 1/2017 Inoue .................. B01D 71/32
2019/0063327 A1   2/2019 Sekiguchi

FOREIGN PATENT DOCUMENTS

KR  10-2019-0024751 A   3/2019
KR  10-2019-0125759 A   11/2019

OTHER PUBLICATIONS

Yana et al., "DFT Study of Proton Transfer in Methyl Urocanate and Butyl Urocanate", Macromol. Symp., vol. 354—5 pages (2015).

* cited by examiner

*Primary Examiner* — Gary D Harris
(74) *Attorney, Agent, or Firm* — Mintz Levin Cohn Ferris Glovksy and Popeo, P.C.; Peter F. Corless

(57) ABSTRACT

A method of evaluating a movement tendency of ions in an electrolyte membrane includes counting inter-movement ions, counting intra-movement ions and calculating the ratio of the intra-movement ions and inter-movement of ions. The movement tendency of ions is predicted based on the ratio. In the case of evaluating a movement tendency of ions using the method, since the structure of the electrolyte membrane in which the ratios of intra-movement and inter-movement are maximized is predicted through measurement of the ratios of the intra-movement and inter-movement of ions, ohmic resistance that may occur in a membrane-electrode assembly (MEA) may be reduced. The electrolyte membrane having the optimal structure predicted by the method can be applied to a fuel cell to increase its performance.

14 Claims, 13 Drawing Sheets

(51) Int. Cl.
*H01M 8/1004* (2016.01)
*H01M 8/1023* (2016.01)
*H01M 8/1032* (2016.01)
*H01M 8/1067* (2016.01)

(58) Field of Classification Search
CPC ........ H01M 2008/1095; H01M 8/1018; Y02E 60/50
USPC .......................................................... 429/483
See application file for complete search history.

a) WHEN DISTANCE ($D_{T_1}$) BETWEEN FIRST TARGET ATOM (A1) WHICH IS ELECTRICALLY CHARGED AND PRESENT ON SKELETON OF POLYMER (P1) FORMING AN ELECTROLYTE MEMBRANE AND COUNTERPART ION (I) WHICH HAS ELECTRIC CHARGES OPPOSITE TO THOSE OF TARGET ATOM AND PRESENT OUTSIDE POLYMER IS WITHIN PREDETERMINED REFERENCE DISTANCE ($D_S$) AT TIME OF $T_1$, WHEN DISTANCE ($D_{T_1+\Delta t}$) BETWEEN FIRST TARGET ATOM (A1) AND COUNTERPART ION (I) EXCEEDS REFERENCE DISTANCE ($D_S$) AND IS WITHIN PREDETERMINED CUTOFF DISTANCE ($D_C$) AT TIME OF $T_1+\Delta t$ ($S_{A1}$), OR WHEN BOTH DISTANCE ($D_{T_1+\Delta t}$) BETWEEN FIRST TARGET ATOM (A1) AND COUNTERPART ION (I) AND DISTANCE ($D_{T_1+\Delta t}$) BETWEEN SECOND TARGET ATOM (A2) WHICH IS ELECTRICALLY CHARGED AND PRESENT ON SKELETON OF SECOND POLYMER (P2) FORMING ELECTROLYTE MEMBRANE AND COUNTERPART ION (I) ARE WITHIN REFERENCE DISTANCE ($D_S$) ($S_{A2}$), COLLECTING IDENTIFICATION NUMBER ($N_{P1}$) GIVEN TO FIRST POLYMER (P1) INCLUDING FIRST TARGET ATOM (A1) — S110 b) WHEN DISTANCE ($D_{T2}$) BETWEEN FIRST TARGET ATOM (A1) AND COUNTERPART ION (I) EXCEEDS REFERENCE DISTANCE ($D_S$) AND IS PRESENT WITHIN PREDETERMINED CUTOFF DISTANCE ($D_C$) ($S_{B1}$) OR IN CASE WHERE BOTH DISTANCE ($D_{T2}$) BETWEEN FIRST TARGET ATOM (A1) AND COUNTERPART ION (I) AND DISTANCE ($D_{T2}$) BETWEEN SECOND TARGET ATOM (A2) AND COUNTERPART ION (I) ARE PRESENT WITHIN REFERENCE DISTANCE ($D_S$) ($S_{B2}$), FROM TIME OF $T_1+\Delta t$ TO TIME OF $T_2$, AND ALSO, IN CASE WHERE DISTANCE ($D_{T2+\Delta t}$) BETWEEN SECOND TARGET ATOM (A2) AND COUNTERPART ION (I) IS PRESENT WITHIN REFERENCE DISTANCE ($D_S$) AT TIME OF $T_2+\Delta t$, COLLECTING AN IDENTIFICATION NUMBER ($N_{P2}$) GIVEN TO SECOND POLYMER (P2) INCLUDING SECOND TARGET ATOM (A2) — S120 c) DETERMINING WHETHER IDENTIFICATION NUMBER ($N_{P1}$) AND IDENTIFICATION NUMBER ($N_{P2}$) ARE SAME — S130 d) ADDING NUMBER OF COUNTERPART IONS (I) WHEN IDENTIFICATION NUMBER ($N_{P1}$) AND IDENTIFICATION NUMBER ($N_{P2}$) ARE DIFFERENT OR ADDING NUMBER OF COUNTERPART IONS (I) WHEN IDENTIFICATION NUMBER ($N_{P1}$) AND IDENTIFICATION NUMBER ($N_{P2}$) ARE SAME — S140

FIG. 1 a) WHEN DISTANCE ($D_{T_1}$) BETWEEN FIRST TARGET ATOM (A1) WHICH IS ELECTRICALLY CHARGED AND PRESENT ON SKELETON OF POLYMER (P1) FORMING AN ELECTROLYTE MEMBRANE AND COUNTERPART ION (I) WHICH HAS ELECTRIC CHARGES OPPOSITE TO THOSE OF TARGET ATOM AND PRESENT OUTSIDE POLYMER IS WITHIN PREDETERMINED REFERENCE DISTANCE ($D_S$) AT TIME OF $T_1$, WHEN DISTANCE ($D_{T_1+\Delta t}$) BETWEEN FIRST TARGET ATOM (A1) AND COUNTERPART ION (I) EXCEEDS REFERENCE DISTANCE ($D_S$) AND IS WITHIN PREDETERMINED CUTOFF DISTANCE ($D_C$) AT TIME OF $T_1+\Delta t$ ($S_{A1}$), OR WHEN BOTH DISTANCE ($D_{T_1+\Delta t}$) BETWEEN FIRST TARGET ATOM (A1) AND COUNTERPART ION (I) AND DISTANCE ($D_{T_1+\Delta t}$) BETWEEN SECOND TARGET ATOM (A2) WHICH IS ELECTRICALLY CHARGED AND PRESENT ON SKELETON OF SECOND POLYMER (P2) FORMING ELECTROLYTE MEMBRANE AND COUNTERPART ION (I) ARE WITHIN REFERENCE DISTANCE ($D_S$) ($S_{A2}$), COLLECTING IDENTIFICATION NUMBER ($N_{P1}$) GIVEN TO FIRST POLYMER (P1) INCLUDING FIRST TARGET ATOM (A1) —S110 b) WHEN DISTANCE ($D_{T_2}$) BETWEEN FIRST TARGET ATOM (A1) AND COUNTERPART ION (I) EXCEEDS REFERENCE DISTANCE ($D_S$) AND IS PRESENT WITHIN PREDETERMINED CUTOFF DISTANCE ($D_C$) ($S_{B1}$) OR IN CASE WHERE BOTH DISTANCE ($D_{T_2}$) BETWEEN FIRST TARGET ATOM (A1) AND COUNTERPART ION (I) AND DISTANCE ($D_{T_2}$) BETWEEN SECOND TARGET ATOM (A2) AND COUNTERPART ION (I) ARE PRESENT WITHIN REFERENCE DISTANCE ($D_S$) ($S_{B2}$), FROM TIME OF $T_1+\Delta t$ TO TIME OF $T_2$, AND ALSO, IN CASE WHERE DISTANCE ($D_{T_2+\Delta t}$) BETWEEN SECOND TARGET ATOM (A2) AND COUNTERPART ION (I) IS PRESENT WITHIN REFERENCE DISTANCE ($D_S$) AT TIME OF $T_2+\Delta t$, COLLECTING AN IDENTIFICATION NUMBER ($N_{P2}$) GIVEN TO SECOND POLYMER (P2) INCLUDING SECOND TARGET ATOM (A2) —S120 c) DETERMINING WHETHER IDENTIFICATION NUMBER ($N_{P1}$) AND IDENTIFICATION NUMBER ($N_{P2}$) ARE SAME —S130 d) ADDING NUMBER OF COUNTERPART IONS (I) WHEN IDENTIFICATION NUMBER ($N_{P1}$) AND IDENTIFICATION NUMBER ($N_{P2}$) ARE DIFFERENT OR ADDING NUMBER OF COUNTERPART IONS (I) WHEN IDENTIFICATION NUMBER ($N_{P1}$) AND IDENTIFICATION NUMBER ($N_{P2}$) ARE SAME —S140 e1) CALCULATING SUM OF NUMBERS OF COUNTERPART IONS (I) IN CASE WHERE IDENTIFICATION NUMBER ($N_{P1}$) AND IDENTIFICATION NUMBER ($N_{P2}$) ARE DIFFERENT AS A RESULT OF MOVEMENT TENDENCY BETWEEN POLYMERS —S150

FIG. 6 a) WHEN DISTANCE ($D_{T_1}$) BETWEEN FIRST TARGET ATOM (A1) WHICH IS ELECTRICALLY CHARGED AND PRESENT ON SKELETON OF POLYMER (P1) FORMING AN ELECTROLYTE MEMBRANE AND COUNTERPART ION (I) WHICH HAS ELECTRIC CHARGES OPPOSITE TO THOSE OF TARGET ATOM AND PRESENT OUTSIDE POLYMER IS WITHIN PREDETERMINED REFERENCE DISTANCE ($D_S$) AT TIME OF $T_1$, WHEN DISTANCE ($D_{T_1+\Delta t}$) BETWEEN FIRST TARGET ATOM (A1) AND COUNTERPART ION (I) EXCEEDS REFERENCE DISTANCE ($D_S$) AND IS WITHIN PREDETERMINED CUTOFF DISTANCE ($D_C$) AT TIME OF $T_1+\Delta t$ ($S_{A1}$), OR WHEN BOTH DISTANCE ($D_{T_1+\Delta t}$) BETWEEN FIRST TARGET ATOM (A1) AND COUNTERPART ION (I) AND DISTANCE ($D_{T_1+\Delta t}$) BETWEEN SECOND TARGET ATOM (A2) WHICH IS ELECTRICALLY CHARGED AND PRESENT ON SKELETON OF SECOND POLYMER (P2) FORMING ELECTROLYTE MEMBRANE AND COUNTERPART ION (I) ARE WITHIN REFERENCE DISTANCE ($D_S$) ($S_{A2}$), COLLECTING IDENTIFICATION NUMBER ($N_{P1}$) GIVEN TO FIRST POLYMER (P1) INCLUDING FIRST TARGET ATOM (A1) — S110 b) WHEN DISTANCE ($D_{T_2}$) BETWEEN FIRST TARGET ATOM (A1) AND COUNTERPART ION (I) EXCEEDS REFERENCE DISTANCE ($D_S$) AND IS PRESENT WITHIN PREDETERMINED CUTOFF DISTANCE ($D_C$) ($S_{B1}$) OR IN CASE WHERE BOTH DISTANCE ($D_{T_2}$) BETWEEN FIRST TARGET ATOM (A1) AND COUNTERPART ION (I) AND DISTANCE ($D_{T_2}$) BETWEEN SECOND TARGET ATOM (A2) AND COUNTERPART ION (I) ARE PRESENT WITHIN REFERENCE DISTANCE ($D_S$) ($S_{B2}$), FROM TIME OF $T_1+\Delta t$ TO TIME OF $T_2$, AND ALSO, IN CASE WHERE DISTANCE ($D_{T_2+\Delta t}$) BETWEEN SECOND TARGET ATOM (A2) AND COUNTERPART ION (I) IS PRESENT WITHIN REFERENCE DISTANCE ($D_S$) AT TIME OF $T_2+\Delta t$, COLLECTING AN IDENTIFICATION NUMBER ($N_{P2}$) GIVEN TO SECOND POLYMER (P2) INCLUDING SECOND TARGET ATOM (A2) — S120 c) DETERMINING WHETHER IDENTIFICATION NUMBER ($N_{P1}$) AND IDENTIFICATION NUMBER ($N_{P2}$) ARE SAME — S130 d) ADDING NUMBER OF COUNTERPART IONS (I) WHEN IDENTIFICATION NUMBER ($N_{P1}$) AND IDENTIFICATION NUMBER ($N_{P2}$) ARE DIFFERENT OR ADDING NUMBER OF COUNTERPART IONS (I) WHEN IDENTIFICATION NUMBER ($N_{P1}$) AND IDENTIFICATION NUMBER ($N_{P2}$) ARE SAME — S140 e2) CALCULATING SUM OF NUMBERS OF COUNTERPART IONS (I) IN CASE WHERE IDENTIFICATION NUMBER ($N_{P1}$) AND IDENTIFICATION NUMBER ($N_{P2}$) ARE SAME AS A RESULT OF MOVEMENT TENDENCY IN POLYMERS — S160

METHOD AND APPARATUS FOR EVALUATING MOVEMENT TENDENCY OF IONS IN ELECTROLYTE MEMBRANE

CROSS-REFERENCE TO RELATED APPLICATION

This application is based on and claims the benefit of priority to Korean Patent Application No. 10-2018-0088839, filed on Jul. 30, 2018, in the Korean Intellectual Property Office, the disclosure of which is incorporated herein in its entirety by reference.

TECHNICAL FIELD

The present disclosure relates to a method and apparatus for evaluating a movement tendency of ions in an electrolyte membrane.

BACKGROUND

A polymer electrolyte fuel cell (PEFC) using a polymer electrolyte membrane has a lower operating temperature, higher efficiency, a higher current density and output density, a shorter startup time, a faster response according to a load change than those of other types of fuel cell. In particular, since the PEFC uses a polymer electrolyte membrane, the PEFC may have a less possibility of corrosion, may not be required to be adjusted in electrolyte, and may be less affected than other fuel cells even in a change in pressure of a reaction gas.

The polymer electrolyte membrane is required to have physical properties of high ionic conductivity, high mechanical strength, and low gas permeability. Properties such as ionic conductivity of the polymer electrolyte membrane may not be easily measured by an experiment through a polymer forming the polymer electrolyte membrane and functional groups resulting from a modification.

SUMMARY

An aspect of the present disclosure provides an evaluation method capable of calculating a qualitative/quantitative value of an ion movement tendency according to structures of an electrolyte membrane by reflecting a concept of adsorption and desorption (or elimination) between ions and atoms in a polymer electrolyte membrane.

Another aspect of the present disclosure provides an apparatus for evaluating a movement tendency of ions in an electrolyte membrane implementing the above method.

A further aspect provides a method and apparatus for evaluating a movement tendency of ions in a polymer electrolyte membrane by determining a movement tendency of ions generated according to a change in chains as a skeleton of a polymer forming the polymer electrolyte membrane and in a structure according to a modification of the electrolyte membrane using the concept of adsorption/desorption between a target atom present in a state of being electrically charged on the skeleton of the polymer forming the electrolyte membrane and a counterpart ion (or a corresponding ion) having electric charges opposite to those of the charged electric charges.

In this disclosure, "adsorption" refers to a state in which the electrically charged target atom and the counterpart ion having electric charges opposite to those of the electrically charged electric charge are restricted within a predetermined distance.

Also, in this disclosure, "desorption" refers to a state in which the counterpart ion having electric charges opposite to those of the target atom gets free from the state of being restricted from the target atom present on the chain (skeleton) of the polymer forming the electrolyte membrane and freely movable.

Also, in this disclosure, "movement tendency of ions" refers to results of calculating a tendency that the counterpart ion follows a movement between different polymers (hereinafter, also referred to as an "inter-movement") forming the electrolyte membrane or a movement in the same polymer (hereinafter, also referred to as an "intra-movement") quantitatively/qualitatively.

According to an exemplary embodiment of the present disclosure, a method for evaluating a movement tendency of ions in an electrolyte membrane includes a) when a distance ($d_{T1}$) between a first target atom A1 which is electrically charged and present on a skeleton of the polymer P1 forming an electrolyte membrane and a counterpart ion I which has electric charges opposite to those of the target atom and present outside the polymer is within a predetermined reference distance ($d_s$) at a time of $T_1$, when a distance ($d_{T1+\Delta t1}$) between the first target atom A1 and the counterpart ion I exceeds the reference distance ($d_s$) and is within a predetermined cutoff distance ($d_c$) at a time of $T_1+\Delta t1$ (state ($S_{a1}$)), or when both the distance ($d_{T1+\Delta t1}$) between the first target atom A1 and the counterpart ion I and the distance ($d_{T1+\Delta t1}$) between a second target atom A2 which is electrically charged and present on a skeleton of a second polymer P2 forming the electrolyte membrane and the counterpart ion I are within the reference distance ($d_s$) (state ($S_{a2}$)), collecting an identification number ($N_{P1}$) given to the first polymer P1 including the first target atom A1; b) when a distance ($d_{T2}$) between the first target atom A1 and the counterpart ion I exceeds the reference distance ($d_s$) and is present within the predetermined cutoff distance ($d_c$) (state ($S_{b1}$)) or in case where both the distance ($d_{T2}$) between the first target atom A1 and the counterpart ion I and the distance ($d_{T2}$) between the second target atom A2 and the counterpart ion I are present within the reference distance ($d_s$) (state ($S_{b1}$)), from the time of $T_1+\Delta t1$ to the time of $T_2$, and also, in case where a distance ($d_{T2+\Delta t2}$) between the second target atom A2 and the counterpart ion I is present within the reference distance ($d_s$) at the time of $T_2+\Delta t2$, collecting an identification number ($N_{P2}$) given to the second polymer P2 including the second target atom A2; c) determining whether an identification number ($N_{P1}$) and an identification number ($N_{P2}$) are the same; and d) adding the number of the counterpart ions I when the identification number ($N_{P1}$) and the identification number ($N_{P2}$) are different or adding the number of the counterpart ions I when the identification number ($N_{P1}$) and the identification number ($N_{P2}$) are different.

The $\Delta t1$ and $\Delta t2$ may be 0.1 to 500 picoseconds.

The first polymer P1 and the second polymer P2 may each include a fluororesin or a hydrocarbon resin terminated with a negative charge function group containing the first target atom A1 and a negative charge function group containing the second target atom A2.

The fluororesin may include a copolymer including repeat units derived from tetrafluoroethylene and repeat units derived from perfluorinated vinyl ether.

The hydrocarbon resin may include any one selected from the group consisting of a polystyrene-based resin, a polyarylene ether-based resin, and a polypenylene-based resin.

The negative charge function group containing the first target atom A1 and the negative charge function group containing the second target atom A2 may each be a sulfonic acid group containing a sulfur atom.

The counterpart ion I may be a hydronium ion.

The distance ($d_{T1}$), the distance ($d_{T1+\Delta t1}$), the distance ($d_{T2}$), and the distance ($d_{T2+\Delta t2}$) may be calculated through position information of the target atom and the counterpart ion in the time frame of $T_1$, $T_1+\Delta t1$, $T_2$, and $T_2+\Delta t2$ using a molecular dynamics simulation.

The reference distance ($d_s$) may be the sum of a van der Waals distance between the target atom A and the counterpart ion I and a vibration distance of each of the target atom A and the counterpart ion I.

The cutoff distance ($d_c$) may be a distance between the target atom and another homogeneous atom which has the same electric charges as those of the target atom and is present.

The method may further include: e1) calculating the sum of the numbers of counterpart ions (I) in case where the identification number $N_{P1}$ and the identification number $N_{P2}$ are different as a result of a movement tendency between polymers.

The method may further include: e2) calculating the sum of the numbers of counterpart ions (I) in case where the identification number $N_{P1}$ and the identification number $N_{P2}$ are the same as a result of a movement tendency in a polymer.

In the calculation, a value having a valid ion movement tendency may be calculated by dividing the sum of the counterpart ions I in case where the identification number $N_{P1}$ and the identification number $N_{P2}$ are different by the number of the counterpart ions I in case where the identification number $N_{P1}$ and the identification number $N_{P2}$ are different and the number of counterpart ions I in case where the identification number $N_{P1}$ and the identification number $N_{P2}$ are the same.

In the calculation, a value having a valid ion movement tendency may be calculated by dividing the sum of the counterpart ions I in case where the identification number $N_{P1}$ and the identification number $N_{P2}$ are the same by the number of the counterpart ions I in case where the identification number $N_{P1}$ and the identification number $N_{P2}$ are different and the number of counterpart ions I in case where the identification number $N_{P1}$ and the identification number $N_{P2}$ are the same.

According to another exemplary embodiment of the present disclosure, an apparatus for evaluating a movement tendency of ions in an electrolyte membrane includes: a first collecting module collecting an identification number ($N_{P1}$) given to a first polymer P1 including a first target atom A1, when a distance ($d_{T1}$) between the first target atom A1 which is electrically charged and present on a skeleton of a polymer P1 forming an electrolyte membrane and the counterpart ion I which has electric charges opposite to those of the target atom and present outside the polymer is within a predetermined reference distance ($d_s$) at a time of $T_1$, when a distance ($d_{T1+\Delta t1}$) between the first target atom A1 and the counterpart ion I exceeds the reference distance ($d_s$) and is within a predetermined cutoff distance ($d_c$) at a time of $T_1+\Delta t1$ (state ($S_{a1}$)), or when both the distance ($d_{T1+\Delta t1}$) between the first target atom A1 and the counterpart ion I and the distance ($d_{T1+\Delta t1}$) between a second target atom A2 which is electrically charged and present on a skeleton of a second polymer P2 forming the electrolyte membrane and the counterpart ion I are within the reference distance ($d_s$) (state ($S_{a2}$)); a second collecting module collecting an identification number ($N_{P2}$) given to the second polymer P2 including the second target atom A2, when a distance ($d_{T2}$) between the first target atom A1 and the counterpart ion I exceeds the reference distance ($d_s$) and is present within the predetermined cutoff distance ($d_c$) (state ($S_{b1}$)) or in case where both the distance ($d_{T2}$) between the first target atom A1 and the counterpart ion I and the distance ($d_{T2}$) between the second target atom A2 and the counterpart ion I are present within the reference distance ($d_s$) (state ($S_{b2}$)), from the time of $T_1+\Delta t1$ to the time of $T_2$, and also, in case where a distance ($d_{T2+t}$) between the second target atom A2 and the counterpart ion I is present within the reference distance ($d_s$) at the time of $T_2+\Delta t2$; a determining module determining whether an identification number ($N_{P1}$) and an identification number ($N_{P2}$) are the same; and an adding module adding the number of the counterpart ions I when the identification number ($N_{P1}$) and the identification number ($N_{P2}$) are different or adding the number of the counterpart ions I when the identification number ($N_{P1}$) and the identification number ($N_{P2}$) are the same.

The $\Delta t1$ and $\Delta t2$ may be 0.1 to 500 picoseconds.

The first polymer P1 and the second polymer P2 may each include a fluororesin or a hydrocarbon resin terminated with a negative charge function group containing the first target atom A1 and a negative charge function group containing the second target atom A2.

The fluororesin may include a copolymer including repeat units derived from tetrafluoroethylene and repeat units derived from perfluorinated vinyl ether.

The hydrocarbon resin may include any one selected from the group consisting of a polystyrene-based resin, a polyarylene ether-based resin, and a polypenylene-based resin.

The negative charge function group containing the first target atom A1 and the negative charge function group containing the second target atom A2 may each be a sulfonic acid group containing a sulfur atom.

The counterpart ion I may be a hydronium ion.

The distance ($d_{T1}$), the distance ($d_{T1+\Delta t1}$), the distance ($d_{T2}$), and the distance ($d_{T2+\Delta t2}$) may be calculated through position information of the target atom and the counterpart ion in the time frame of $T_1$, $T_1+\Delta t1$, $T_2$, and $T_2+\Delta t2$ using a molecular dynamics simulation.

The reference distance ($d_s$) may be the sum of a van der Waals distance between the target atom A and the counterpart ion I and a vibration distance of each of the target atom A and the counterpart ion I.

The cutoff distance ($d_c$) may be a distance between the target atom and another homogeneous atom which has the same electric charges as those of the target atom and is present.

The apparatus may further include: a first calculating module calculating the sum of the numbers of counterpart ions (I) in case where the identification number $N_{P1}$ and the identification number $N_{P2}$ are different as a result of a movement tendency between polymers.

The apparatus may further include: a second calculating module calculating the sum of the numbers of counterpart ions (I) in case where the identification number $N_{P1}$ and the identification number $N_{P2}$ are the same as a result of a movement tendency in a polymer.

In the calculation, a value having a valid ion movement tendency may be calculated by dividing the sum of the counterpart ions I in case where the identification number $N_{P1}$ and the identification number $N_{P2}$ are different by the number of the counterpart ions I in case where the identification number $N_{P1}$ and the identification number $N_{P2}$ are different and the number of counterpart ions I in case where the identification number $N_{P1}$ and the identification number $N_{P2}$ are the same.

In the calculation, a value having a valid ion movement tendency may be calculated by dividing the sum of the counterpart ions I in case where the identification number $N_{P1}$ and the identification number $N_{P2}$ are the same by the number of the counterpart ions I in case where the identification number $N_{P1}$ and the identification number $N_{P2}$ are different and the number of counterpart ions I in case where the identification number $N_{P1}$ and the identification number $N_{P2}$ are the same.

BRIEF DESCRIPTION OF THE DRAWINGS

The above and other aspects, features and advantages of the present disclosure will be more apparent from the following detailed description taken in conjunction with the accompanying drawings.

FIG. 1 is a flowchart illustrating a method for evaluating a movement tendency of ions in an electrolyte membrane according to an embodiment of the present disclosure.

FIGS. 6 to 8 are flowcharts illustrating a method of evaluating a movement tendency of ions in an electrolyte membrane according to an embodiment of the present disclosure.

DETAILED DESCRIPTION

Figure 2:
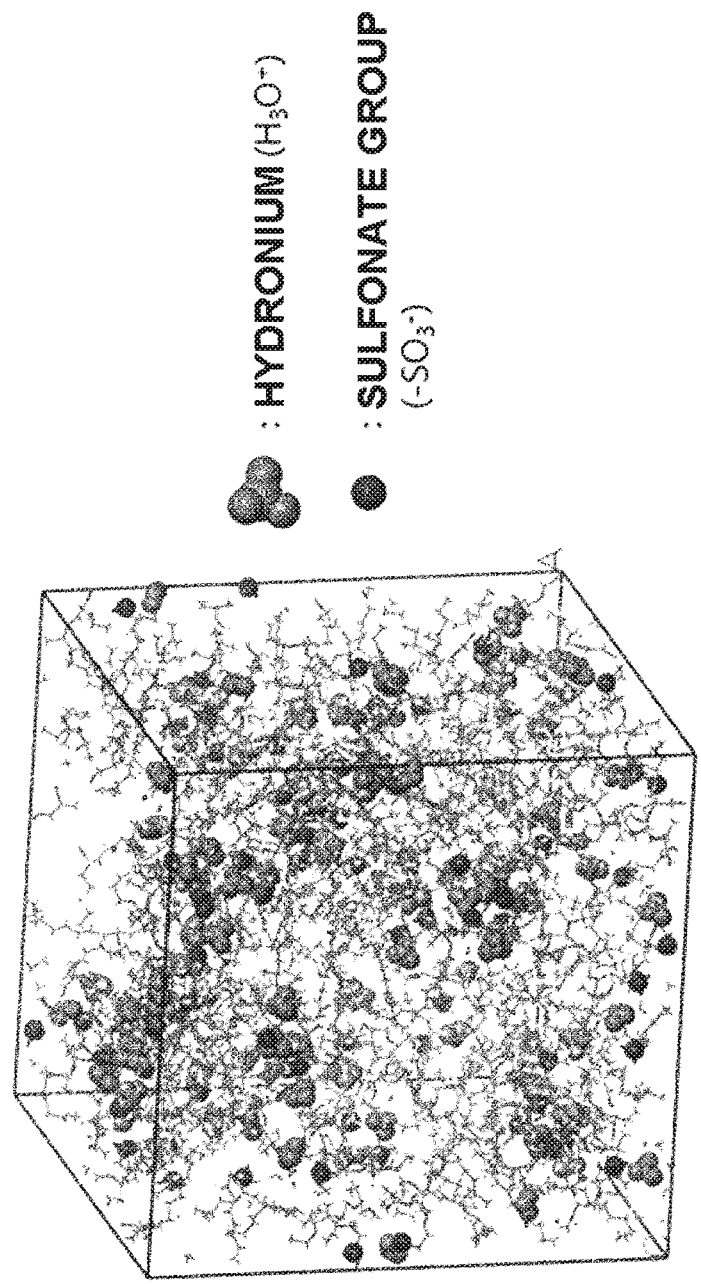
FIG. 2 is a schematic diagram illustrating a state of a target atom which is electrically charged and present on a skeleton of a polymer forming an electrolyte membrane and a counterpart ion present outside the polymer in a molecular dynamics simulation according to an embodiment of the present disclosure.

Hereinafter, embodiments of will be described in detail.

The present disclosure provides a method for evaluating a movement tendency of ions in an electrolyte membrane.

Generally, properties such as ionic conductivity of the polymer electrolyte membrane is not easily measured by an experiment through a polymer forming the polymer electrolyte membrane and functional groups resulting from a modification. In order to design the electrolyte membrane and to evaluate factors affecting ion conductivity, attempts may be made to predict properties such as ion conductivity of the electrolyte membrane based on quantum or molecular dynamics simulation in advance. As part of such efforts, a concept that molecules and atoms oscillate constantly in order to be in a stable state of energy may be introduced, and research may be ongoing to predict an ion conductivity value by measuring a value regarding how easily atoms or molecules assuming positive charges as targets of conduction move with respect to negatively charged atoms present at side chains of a polymer forming an electrolyte membrane. This method, however, measures only whether ions move, so it does not sufficiently reflect a concept regarding how specifically atoms or molecules move or a movement tendency of related ions (e.g., whether negatively charged atoms or molecules move in the same polymer forming an electrolyte membrane or whether they move between different polymers forming the electrolyte membrane).

Further, in the case of a movement of negatively charged atoms in the same polymer forming the electrolyte membrane, a tendency thereof may be determined according to characteristics of the electrolyte membrane, for example, a length and structure of the side chains of the polymer, but in the case of a movement between different polymers forming the electrolyte membrane, a tendency thereof may be affected by a manufacturing process, as well as by the foregoing characteristics of the electrolyte membrane, and thus, there are limitations in predicting a movement tendency of the ions to derive an optimized structure of the electrolyte membrane.

FIG. 1 is a flowchart illustrating a method for evaluating a movement tendency of ions in an electrolyte membrane according to an embodiment of the present disclosure. Hereinafter, each operation of the method for evaluating a movement tendency of ions will be described in detail.

In embodiments, an electrolyte membrane physically separates an anode and a cathode and includes target atoms A which are electrically charged and present in a skeleton of polymers P such as a first polymer P1 and a second polymer P2 forming an electrolyte membrane, for example, target atoms A which may be designated as a first target atom A1, a second target atom A2, and the like, to thereby serve as a passage guiding a counterpart ion I, which is charged with electric charges opposite to electric charges charged in the target atoms A generated in the anode, to be transmitted to the cathode.

For example, the polymers P forming the electrolyte membrane may include a fluororesin or a hydrocarbon resin which is terminated with a negative charge functional group containing the target atom A, but is not limited thereto. Here, when the polymer P contains a fluororesin, the negative charge functional group containing the target atom A may be a sulfonic acid group ($-SO_3^-$) containing a sulfur atom which is the target atom A.

The fluororesin may include a copolymer including repeat units derived from tetrafluoroethylene and repeat units derived from perfluorinated vinyl ether.

The hydrocarbon resin may include a copolymer including repeat units derived from tetrafluoroethylene and repeat units derived from perfluorinated alkyl vinyl ether.

The counterpart ion I may be electrically charged with electric charges opposite to those of the target atom A. In embodiments, the counterpart ion I is positively charged. For example, the counterpart ion I may be a hydronium ion ($H_3O^+$) which is positively charged. More specifically, it may be hydronium existing outside the fluorine-based polymer constituting the electrolyte membrane.

As illustrated in FIG. 2, in order to realize a molecular dynamics simulation, in an embodiment of the present disclosure, an electrolyte membrane is modeled with a nafion-based polymer P, which is a polymer including a fluororesin terminated with a negative charge functional group containing the target atom A, whereby the target atoms A are set to become a sulfur atom contained in a sulfonic acid group as a negative charge functional group and the outside of the nafion-based polymer P constituting the electrolyte membrane is filled with hydronium ions and water such that the hydration number (A) is 3 so that the counterpart ion I which has electric charges opposite to those of the sulfur atom as the target atoms A and is present outside the nafion-based polymer P may be a hydronium ion.

Before performing evaluation of the movement tendency of ions in the electrolyte membrane, an identification number N may be given to each of polymers P and the target atoms A contained in terminated and negatively charged functional group of the polymers P.

Figure 3:
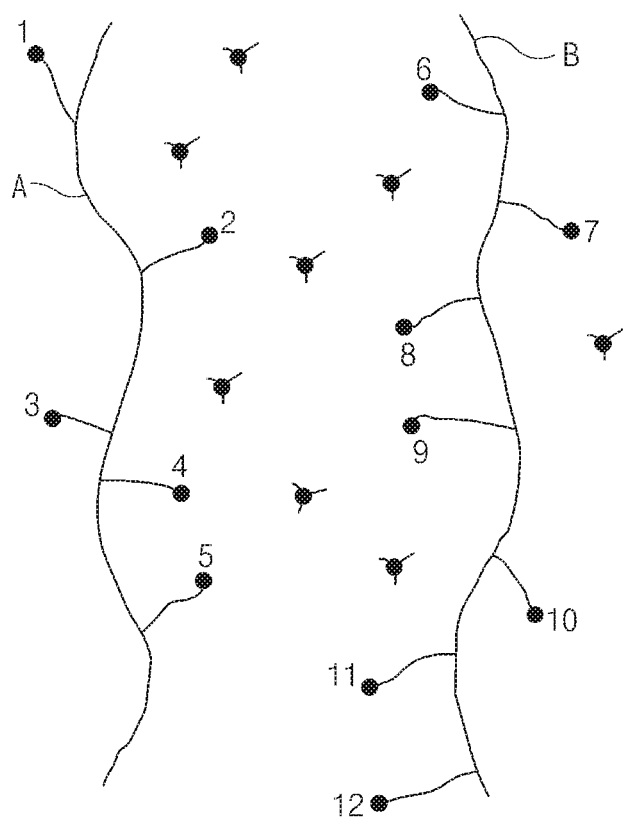
FIG. 3 is a schematic diagram illustrating identification numbers given to some of polymers forming an electrolyte membrane, target atoms which are charged and present in a skeleton of the polymer, and counterpart ions existing outside the polymer, according to an embodiment of the present disclosure.

As illustrated in FIG. 3, referring to the first polymer P1 and the second polymer P2 corresponding to some of the numerous polymers P constituting the electrolyte membrane, number NA which is an identification number ($N_{P1}$) may be previously given to the first polymer P1 and number NB which is an identification number ($N_{P2}$) may be previously given to the second polymer P2. Also, identification numbers different from the identification number given to the polymers P. For example, identification numbers 1 to 5, may be given to the first target atom A1 which is electrically charged and present on the skeleton of the first polymer P1 to which the identification number ($N_{P1}$) is given, and identification numbers different from the identification numbers given to the polymers P, for example, identification numbers 6 to 12, may be given to the second target atom A2 electrically charged and present in the skeleton of the second polymer P2 to which the identification number ($N_{P2}$) is given. However, since this is merely an example for facilitating the understanding of the present disclosure, it is possible to use any identification number given to identify each of the polymers P and the target atoms A, without being limited thereto.

Operation S110

In operation S110, in embodiments, a) in case where a distance ($d_{T1}$) between the first target atom A1 which is electrically charged and present on the skeleton of the polymer P1 forming an electrolyte membrane and the counterpart ion I which has electric charges opposite to those of the target atom and present outside the polymer is within a predetermined reference distance ($d_s$) at a time of $T_1$, in case where a distance ($d_{T1+\Delta t1}$) between the first target atom A1 and the counterpart ion I exceeds the reference distance ($d_s$) and is within a predetermined cutoff distance ($d_c$) at a time of $T_1+\Delta t1$ (state ($S_{a1}$)), or in case where both the distance ($d_{T1+\Delta t1}$) between the first target atom A1 and the counterpart ion I and the distance ($d_{T1}+\Delta t1$) between the second target atom A2 which is electrically charged and present on the skeleton of the second polymer P2 forming the electrolyte membrane and the counterpart ion I are within the reference distance ($d_s$) (state ($S_{a2}$)), the identification number ($N_{P1}$) given to the first polymer P1 including the first target atom A1 is collected.

In embodiments, the time of $T_1$ may be any one of predetermined time points for performing evaluation of a movement tendency of ions in the electrolyte membrane and may be a certain time without being limited if it is a start time for a user to perform evaluation. Preferably, the time of $T_1$ may be a time in a state in which the counterpart ion I is present in a state of being adsorbed to the first target atom A1 as the distance ($d_{T1}$) between the first target atom A1 which is present on the skeleton of the first polymer P1 and the counterpart ion I is within the predetermined reference distance ($d_s$).

After a time $\Delta t1$ has elapsed from the time $T_1$ at which the counterpart ion I was present in the state of being adsorbed to the first object atom (A1), in a state in which the distance ($d_{T1+\Delta t1}$) between the first target atom A1 and the counterpart ion I exceeds the reference distance ($d_s$) and is present within the predetermined cutoff distance ($d_c$), that is, in case where the counterpart ion I is present in a state of being eliminated from the first target atom Q1 (state ($S_{a1}$)), or in a state in which both the distance ($d_{T1}+\Delta t1$) between the first target atom A1 and the counterpart ion I and the distance ($d_{T1+\Delta t1}$) between the second target atom A2 which is electrically charged and present on the skeleton of the second polymer P2 forming the electrolyte membrane and the counterpart ion I are present within the reference distance ($d_s$), that is, in case where the counterpart ion I is in a state of being adsorbed to all the second target atoms A2 present at a distance very close to the first target atom A1 (state ($S_{a2}$)), an identification number ($N_{P1}$) of the first polymer P1 where the first target atom A1 to which the counterpart ion I is adsorbed is present in the skeleton is collected at the time of $T_1$.

In embodiments, the time of $T_1+\Delta t1$ refers to a time after a time corresponding to $\Delta t1$ has lapsed from the time of $T_1$. The $\Delta t1$ may be set without a limitation as long as it is a time interval by which the counterpart ion I may cause a change of a state in a relationship with the first counterpart atom A1 in a molecular dynamics simulation, and is preferably, 0.1 to 500 picoseconds, more preferably, 0.1 to 100 picoseconds.

Operation S120

In operation S120, in embodiments, b) in case where a distance ($d_{T2}$) between the first target atom A1 and the counterpart ion I exceeds the reference distance ($d_s$) and is present within the predetermined cutoff distance ($d_c$) (state ($S_{b1}$)) or in case where both the distance ($d_{T2}$) between the first target atom A1 and the counterpart ion I and the distance ($d_{T2}$) between the second target atom A2 and the counterpart ion I are present within the reference distance ($d_s$) (state ($S_{b2}$)), from the time of $T_1+\Delta t1$ to the time of $T_2$, and also, in case where a distance ($d_{T2+\Delta t2}$) between the second target atom A2 and the counterpart ion I is present within the reference distance ($d_s$) at the time of $T_2+\Delta t2$, an identification number ($N_{P2}$) given to the second polymer P2 including the second target atom A2 is collected.

From the time of $T_1+\Delta t1$ to the time of $T_2$, the counterpart ion I may be present in a state of being eliminated from the first target atom A1.

In this manner, until the time of $T_2$, which is a time after the counterpart ion I present in a state of being adsorbed to the first object atom (A1) at the time of $T_1$ is present in a state of being eliminated from the first target atom A1 until the time of $T_2$, which is a time after the time of about 2t has passed, and in case where the counterpart ion I is adsorbed to the second target atom at the time of $T_2+\Delta t2$, it may be predicted that intra-movement or inter-movement of the counterpart ion I has occurred due to the one time of desorption.

Also, at the time of $T_1+\Delta t1$, the counterpart ion I may be present in a state of being adsorbed to both the first target atom A1 and the second target atom A2 present at a very close distance to the first target atom A1.

In this manner, the counterpart ion I present in a state of being adsorbed to the first target atom A1 at the time of $T_1$ is present in a state of being adsorbed to the first target atom A1 and the second target atom A2 until the time of $T_2$, which is a time after the time of about 2t has passed, and in case where the counterpart ion I is adsorbed to the second target atom at the time of $T_2+\Delta t2$, it may be predicted that the counterpart ion I has moved to the second target atom A2 very close to the first target atom A1, that is, an intra-movement has occurred.

In the method of evaluating a movement tendency of ions in the electrolyte membrane according to embodiments of the present disclosure, the first target atom A1 and the counterpart ion I are present in a state of being adsorbed at the time of $T_1$, and after the time of $\Delta t1$ has passed from the time of $T_1$, the counterpart ion I is eliminated from the first target atom A1 or adsorbed to the first target atom A1 and the second target atom A2, and after this state continues to the time of $T_2$, the counterpart ion I is adsorbed to the second target atom A2 at the time of $T_2+\Delta t2$. During this process, each identification number ($N_p$) given to the polymers P to which the counterpart ion I is adsorbed according to the passage of time from the time of $T_1$ to the time of $T_2+t$ may be identified, thereby screening a movement tendency of the counterpart ion I.

The time of $T_2$ refers to a time after a sufficient time for causing the counterpart ion I to move has passed from the time of $T_1+\Delta t1$ at which the counterpart ion I is present in a state of being eliminated, and the time of $T_2+\Delta t2$ refers to a time after the time corresponding to $\Delta t2$ has passed from the time of $T_2$. The $\Delta t2$ may be set without a limitation as long as it is a time interval by which the counterpart ion I may cause a change of a state in a relationship with the second target atom A2 in a molecular dynamics simulation, and is preferably, 0.1 to 500 picoseconds, and more preferably, 0.1 to 100 picoseconds.

In one embodiment, $\Delta t1$ is the same as $\Delta t2$. In another embodiment, $\Delta t1$ may be different from $\Delta t2$.

The distance ($d_{T1}$), the distance ($d_{T1+\Delta t1}$), the distance $d_{T2}$, and the distance ($d_{T2+\Delta t2}$) in operations S110 and S120 may be calculated through position information of the first target atom A1 or the second target atom A2, and the counterpart ion I at every time frame (unit time) of $T_1$, $T_1+\Delta t1$, $T_2$ and $T_2+\Delta t2$ using a molecular dynamics simulation.

In the case of using the molecular dynamics simulation, values corresponding to positions of the target atom A present in a state of being electrically charged on the skeleton of the polymers P forming the electrolyte membrane according to time and the counterpart ion I present outside the electrolyte membrane may be calculated. Thus, the distance ($d_T$) to the counterpart ion I present outside the electrolyte membrane may be determined with respect to the target atom A present in a state of being electrically charged on the skeleton of the polymers P forming the electrolyte membrane using the position values of the target atom A and the counterpart ion I calculated through the molecular dynamics simulation.

The reference distance $d_s$ in operations S110 and S120 refers to the sum of a van der Waals distance between the target atom A and the counterpart ion I and a vibration distance of each of the target atom A and the counterpart ion I, and the cutoff distance ($d_c$) refers to a distance between the target atom A present in a state of being electrically charged on the skeleton of the polymer P forming the electrolyte membrane and a different homogeneous target atom A present in a state of being electrically charged on the skeleton of the same polymer P as that of the target atom A.

Operation S130

In operation S130, it is determined whether the identification number $N_{P1}$ and the identification number $N_{P2}$ are the same.

In this manner, the identification number $N_p$ given to the polymer P to which the counterpart ion I is adsorbed is identified according to the passage of time from the time of $T_1$ to the time of $T_2+\Delta t2$ and it is determined whether the collected identification number $N_{P1}$ and the identification number $N_{P1}$ are the same, thereby evaluating a movement tendency of the counterpart ion I according to the passage of time.

Specifically, when the identification number $N_{P1}$ and the identification number $N_{P2}$ are different, the first polymer P1 where the first target atom A1 as a target of adsorption occurring at the time of $T_1$ is present and the second polymer P2 where the second target atom A2 as a target of adsorption occurring at the time of $T_2+\Delta t2$ are different, and in this case, it may be evaluated that an inter-movement, which is a movement between the first polymer P1 and the second polymer P2, has occurred.

Also, in case where the identification number $N_{P1}$ and the identification number $N_{P2}$ are the same, the first polymer P1 where the first target atom A1 as a target of adsorption occurring at the time of $T_1$ and the second polymer P2 where the second target atom A2 as a target of adsorption occurring at the time of $T_2+\Delta t2$ are the same or the first target atom A1 and the second target atom A2 are the same, and in this case, it may be evaluated that an intra-movement, which is a movement in the first polymer P1, has occurred.

Operation S140

In operation S140, in embodiments, the numbers of the counterpart ions in case where the identification number $N_{P1}$ and the identification number $N_{P2}$ are different are added or counted. The number of the counterpart ions I in case where the identification number $N_{P1}$ and the identification number $N_{P2}$ are the same are added or counted.

Figure 4:
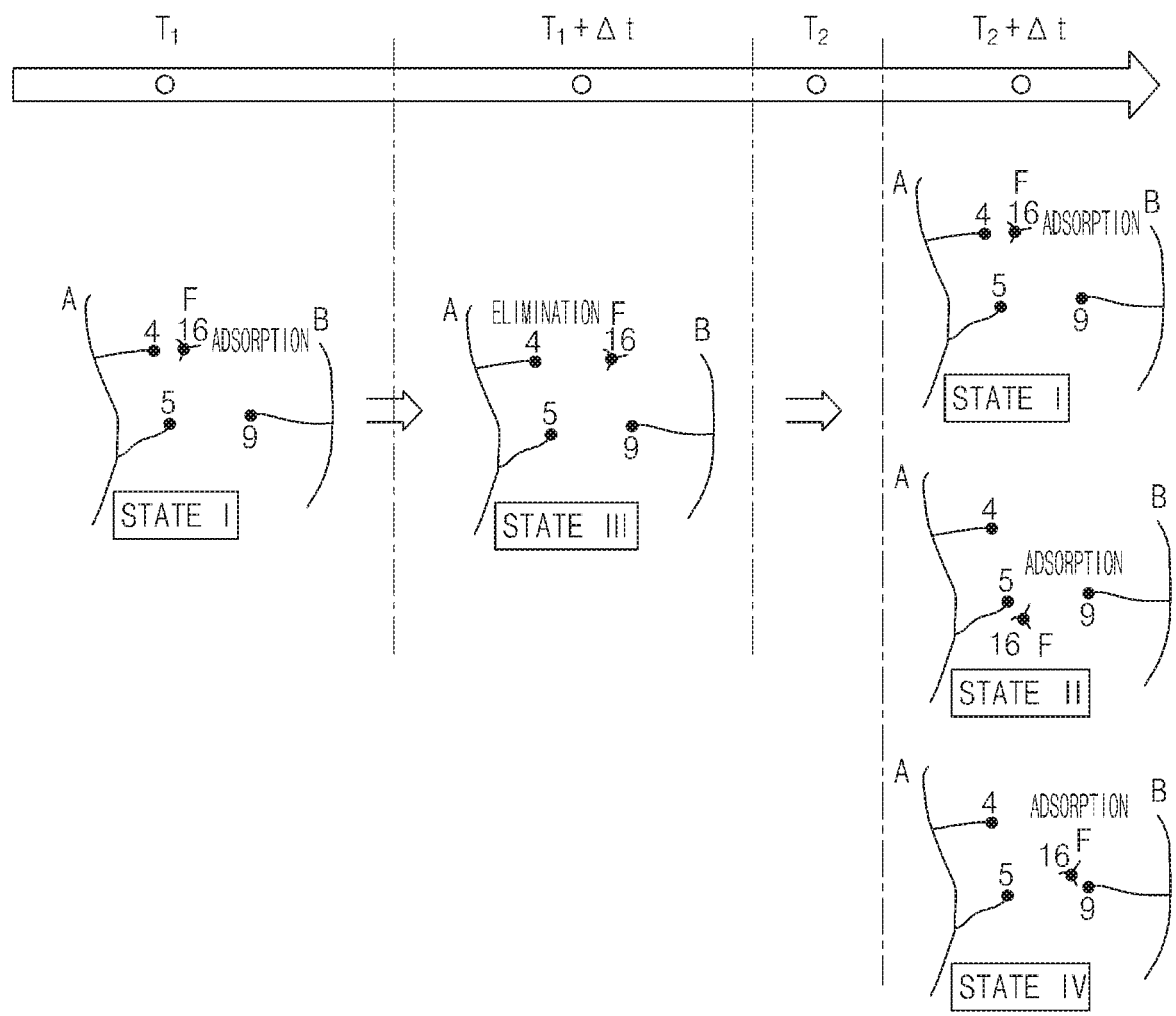
FIG. 4 is a schematic diagram illustrating movement of ions in evaluation of a movement tendency of ions in an electrolyte membrane according to an embodiment of the present disclosure in which 'state III' at a time of $T_1+\Delta t1$ is a state ($S_{a1}$) and a state ($S_{b1}$) in which target ion I is eliminated.
Figure 5:
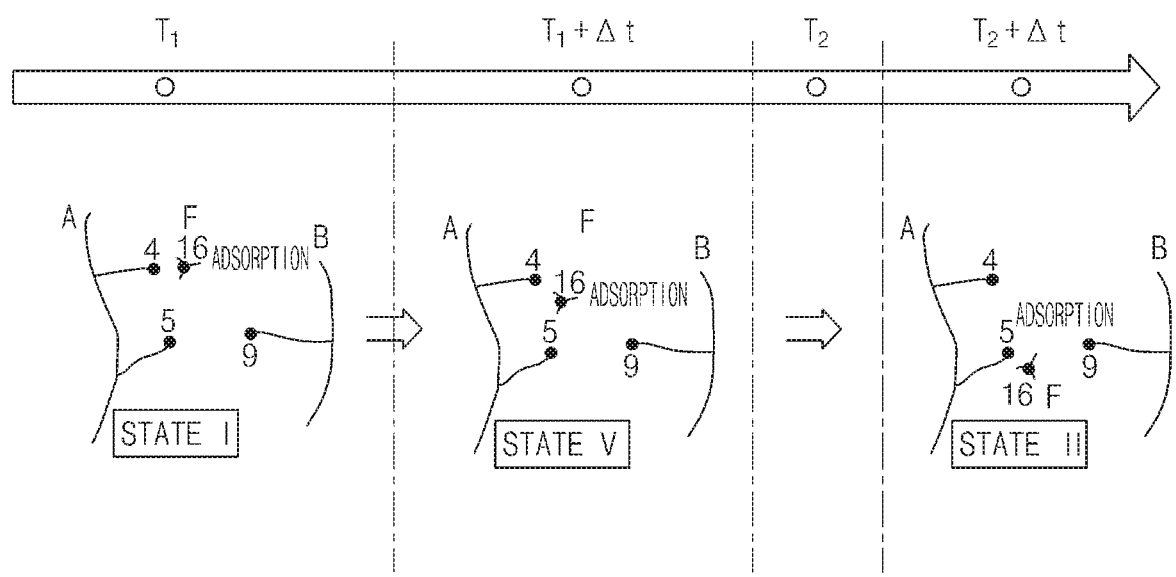
FIG. 5 is a schematic diagram illustrating movement of ions in evaluation of a movement tendency of ions in an electrolyte membrane according to an embodiment of the present disclosure, in which a 'state V' at a time of $T_1+\Delta t1$ is a state ($S_{a2}$) in which target ion I is adsorbed to both target atom #4 and target atom #5.

As illustrated in FIGS. 4 and 5, the movement of the target atoms A and the counterpart ion I may be illustrated as a schematic view from the time $T_1$ to the time $T_2+\Delta t2$, which may appear when the movement tendency of ions in the electrolyte membrane according to an embodiment of the present disclosure is evaluated, but the identification number N proposed herein is merely intended to illustrate an embodiment of the present disclosure.

Specifically, at the time $T_1$, the counterpart ion I is adsorbed to the first target atom A1 which is present in a state of being electrically charged on the skeleton of the first polymer P1 forming the electrolyte membrane and given identification number 4 (state I at the time of $T_1$), eliminated from the first target atom A1 after the time corresponding to $\Delta t1$ has passed from the time of $T_1$ (e.g., after the lapse of 1 picosecond from $T_1$) (state III at the time of $T_1+\Delta t1$), and adsorbed to both the first target atom A! and the second target atom A2 (state V at the time of $T_1+\Delta t1$), and such a state is maintained up to the time of $T_2$, and the counterpart ion I may be adsorbed to the second target atom A2 present in a state of being electrically charged on the skeleton of the first polymer P1 or the second polymer P2 at the time of $T_2+\Delta t2$.

Here, the second object atom (A2) may be #4 given the same identification number as that of the first target atom A1 (state I at the time of $T_2+\Delta t2$), may be #5 present in the same polymer P1 as that of the first target atom A1 (state II at the time of $T_2+\Delta t2$), or may be #9 present in the polymer P2 different from the polymer P1 (state IV at the time of $T_2+\Delta t2$).

The state I at the time of $T_2+\Delta t2$ and the state II at the time of $T_2+\Delta t2$ may be evaluated as an intra-movement which is a movement in the first polymer P1, and the state IV at the time of $T_2+\Delta t2$ may be evaluated as an inter-movement which is a movement between the first polymer P1 and the second polymer P2.

FIG. 6 is a flowchart illustrating a method for evaluating a movement tendency of ions in an electrolyte membrane according to another embodiment of the present disclosure, which may further include e1) the sum of the numbers of counterpart ions (I) in case where the identification number $N_{P1}$ and the identification number $N_{P2}$ are different is calculated as a result of a movement tendency between polymers (S150).

FIG. 7 is a flowchart illustrating a method for evaluating a movement tendency of ions in an electrolyte membrane according to another embodiment of the present disclosure, which may further include e2) the sum of the numbers of counterpart ions (I) in case where the identification number $N_{P1}$ and the identification number $N_{P2}$ are the same is calculated as a result of a movement tendency in a polymer (S160).

Figure 8:
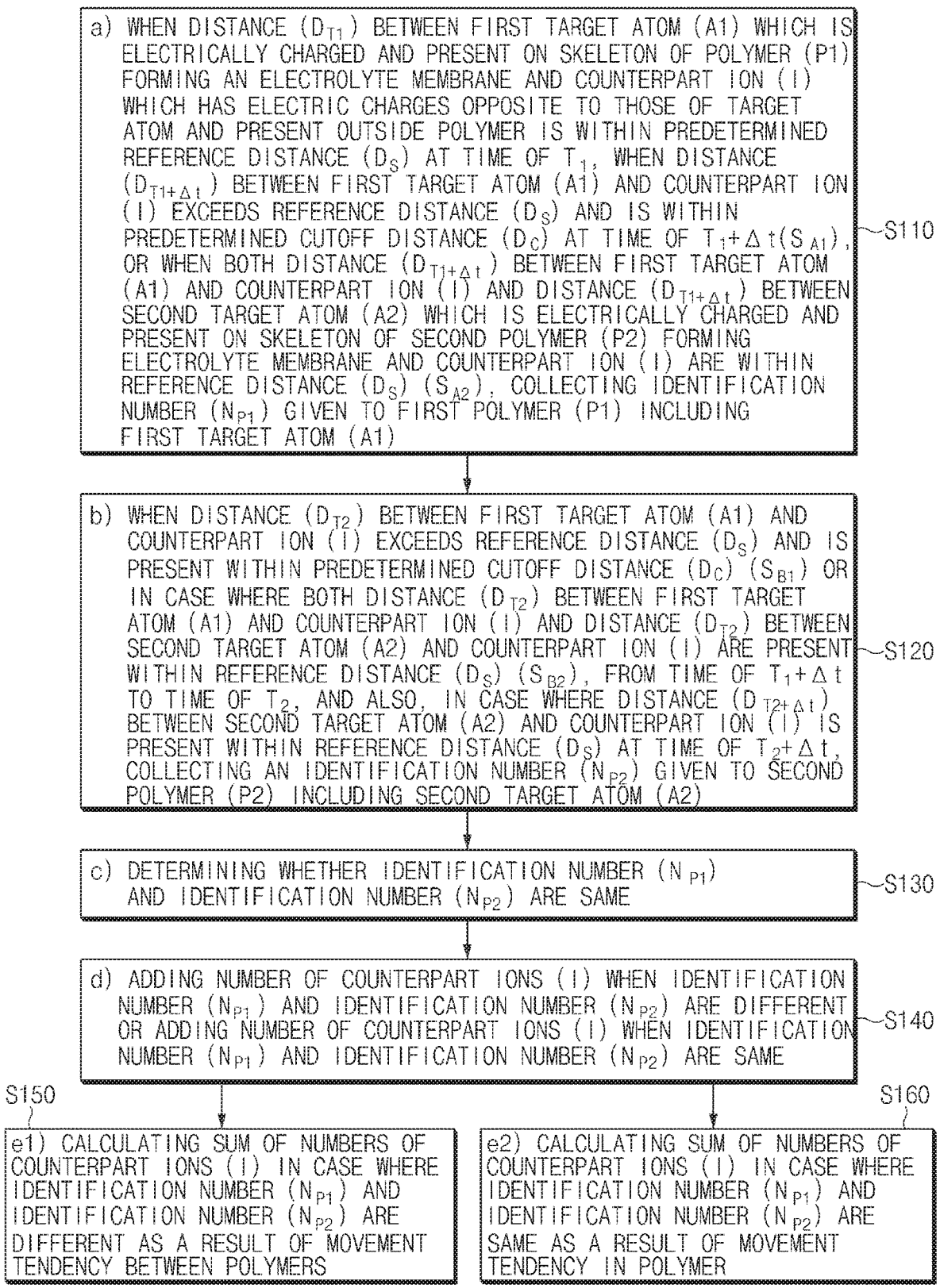

FIG. 8 is a flowchart illustrating a method for evaluating a movement tendency of ions in an electrolyte membrane according to another embodiment of the present disclosure, and the method for evaluating a movement tendency of ions in the electrolyte membrane may include both operation S150 in which the sum of the counterpart ions is calculated as a result of the movement tendency between the polymers and operation S160 in which the sum of the counterpart ions is calculated as a result of the movement tendency in the polymer.

In the calculation, a value having a valid ion movement tendency may be calculated by dividing the sum of the counterpart ions I in case where the identification number $N_{P1}$ and the identification number $N_{P2}$ are different by the number of the counterpart ions I in case where the identification number $N_{P1}$ and the identification number $N_{P2}$ are different and the number of counterpart ions I in case where the identification number $N_{P1}$ and the identification number $N_{P2}$ are the same, and a value having a valid ion movement tendency may be calculated by dividing the sum of the counterpart ions I in case where the identification number $N_{P1}$ and the identification number $N_{P2}$ are the same by the number of the counterpart ions I in case where the identification number $N_{P1}$ and the identification number $N_{P2}$ are different and the number of counterpart ions I in case where the identification number $N_{P1}$ and the identification number $N_{P2}$ are the same.

Figure 9:
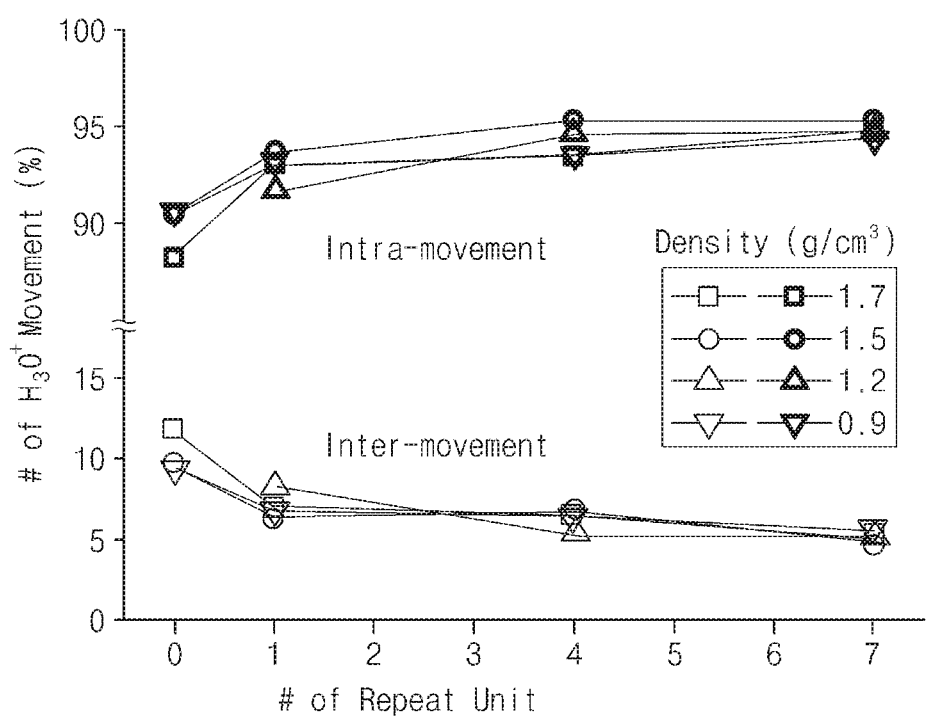
FIGS. 9 to 13 are block diagrams of an apparatus for evaluating a movement tendency of ions in an electrolyte membrane according to an embodiment of the present disclosure.

FIG. 9 is a graph illustrating the results of evaluating a movement tendency of hydronium ions according to the repeat unit of side chains of a nafion ionomer-based electrolyte membrane having characteristics of equivalent weight (EW) 1100 as a fluororesin and various free volumes of the electrolyte membrane using a method for evaluating a movement tendency of ions in the electrolyte membrane according to an embodiment of the present disclosure, in which it is confirmed that a ratio of the occurrence of intra-movement is increased and a ratio of the occurrence of inter-movement is reduced as the repeat unit of the side chains of the electrolyte membrane is increased from 0 to 7, regardless of difference according to the free volumes of the electrolyte membrane. Through this, the structure of the electrolyte membrane in which the ratio of the intra-movement is maximized, while the inter-movement occurs to the maximum may be effectively predicted. The present disclosure provides an apparatus for evaluating a movement tendency of ions in an electrolyte membrane.

Figure 10:
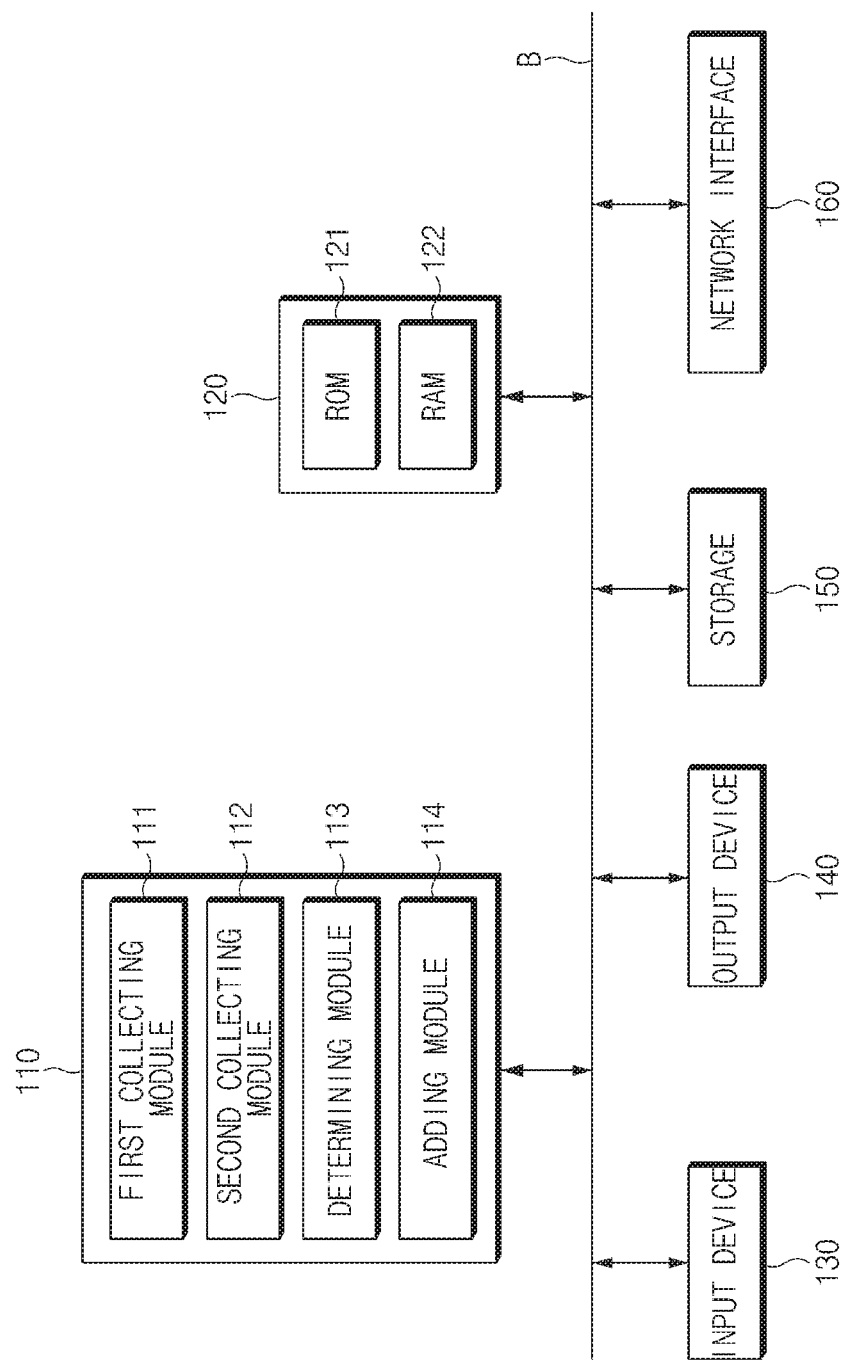
Figure 11:
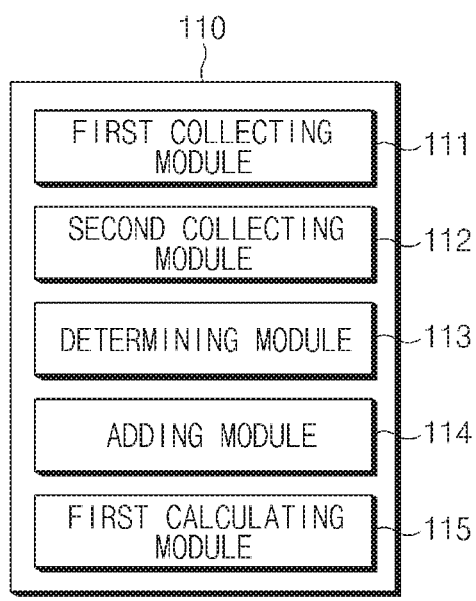
Figure 12:
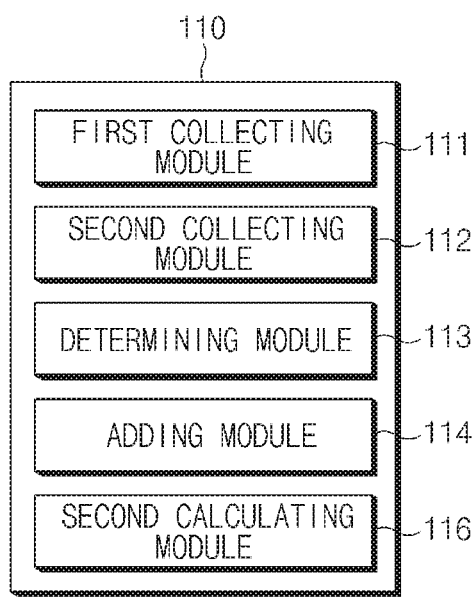
Figure 13:
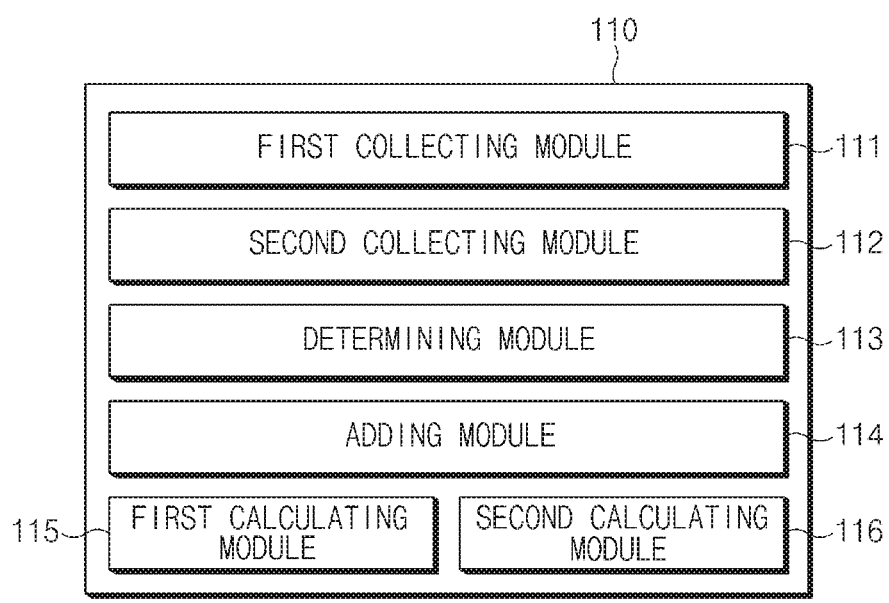

FIG. 10 is a block diagram illustrating an apparatus for evaluating a movement tendency of ions in an electrolyte membrane according to another embodiment of the present disclosure. Hereinafter, each component of the ion tendency evaluation apparatus will be described in detail.

The electrolyte membrane physically separates an anode and a cathode and includes target atoms A which are electrically charged and present in a skeleton of polymers P such as a first polymer P1 and a second polymer P2 forming an electrolyte membrane, for example, target atoms A which may be designated as a first target atom A1, a second target atom A2, and the like, to thereby serve as a passage guiding a counterpart ion I charged with electric charges opposite to electric charges charged in the target atoms A generated in the anode, to the cathode.

For example, the polymers P forming the electrolyte membrane may include a fluororesin which is terminated with a negative charge functional group containing the target atom A, but is not limited thereto. Here, the negative charge functional group containing the target atom A may be a sulfonic acid group ($-SO_3^-$) containing a sulfur atom which is the target atom A.

The fluororesin may include a copolymer including repeat units derived from tetrafluoroethylene and repeat units derived from perfluorinated vinyl ether.

The hydrocarbon resin may include a copolymer including repeat units derived from tetrafluoroethylene and repeat units derived from perfluorinated alkyl vinyl ether.

The counterpart ion I may be electrically charged with electric charges opposite to those of the target atom A, that is, positively charged. For example, the counterpart ion I may be a hydronium ion ($H_3O^+$) which is positively charged. More specifically, it may be hydronium existing outside the fluorine-based polymer constituting the electrolyte membrane.

Before performing a movement tendency of ions in the electrolyte membrane, an identification number N may be given to each of polymers P and the target atoms A terminated and negatively charged functional group of the polymers P.

As for the identification number N, referring to a first polymer P1 and a second polymer P2 corresponding to some of the numerous polymers P constituting the electrolyte membrane, number NA which is an identification number ($N_{P1}$) may be previously given to the polymer P1 and number NB which is an identification number ($N_{P2}$) may be previously given to the polymer P2. Also, identification numbers different from the identification number given to the polymers P, for example, identification numbers 1 to 5, may be given to the first target atom A1 which is electrically charged and present on the skeleton of the first polymer P1 to which the identification number ($N_{P1}$) is given, and identification numbers different from the identification numbers given to the polymers P, for example, identification numbers 6 to 12, may be given to the second target atom A2 electrically charged and present in the skeleton of the second polymer P2 to which the identification number ($N_{P2}$) is given (See FIG. 3). However, since this is merely an example for facilitating the understanding of the present disclosure, it is possible to use any identification number given to identify each of the polymers P and the target atoms A, without being limited thereto.

The ion movement tendency evaluation apparatus includes a processor 110, a memory 120, an input device 130, an output device 140, a storage 150, and a network interface 160 connected through a bus B.

The processor 110 may be executed to so that a movement tendency of the ions may be evaluated. The processor 110 may be realized as a central processing unit (CPU). The processor 110 may be realized as a semiconductor device, or the like, executing processing regarding commands stored in the memory 120 or the storage 150. The processor 110 may include a first collecting module 111, a second collecting module 112, a determining module 113, and an adding module 114.

First Collecting Module 111

In case where a distance ($d_{T1}$) between the first target atom A1 which is electrically charged and present on the skeleton of the polymer P1 forming the electrolyte membrane and the counterpart ion I which has electric charges opposite to those of the target atom and present outside the polymer is within a predetermined reference distance ($d_s$) at a time of $T_1$, in case where a distance ($d_{T1+\Delta t1}$) between the first target atom A1 and the counterpart ion I exceeds the reference distance ($d_s$) and is within the predetermined cutoff distance ($d_c$) at a time of $T_1+\Delta t1$ (state ($S_{a1}$)), or in case where both the distance ($d_{T1+\Delta t1}$) between the first target atom A1 and the counterpart ion I and the distance ($d_{T1+\Delta t1}$) between the second target atom A2 which is electrically charged and present on the skeleton of the second polymer P2 forming the electrolyte membrane and the counterpart ion I are within the reference distance ($d_s$) (state ($S_{a2}$)), the identification number ($N_{P1}$) given to the first polymer P1 including the first target atom A1 is collected.

The time of $T_1$ may be any one of predetermined time points for performing evaluation of a movement tendency of ions in the electrolyte membrane and may be a certain time without being limited if it is a start time for a user to perform evaluation. Preferably, the time of $T_1$ may be a time in a state in which the counterpart ion I is present in a state of being adsorbed to the first target atom A1 as the distance ($d_{T1}$) between the first target atom A1 which is present on the skeleton of the first polymer P1 and the counterpart ion I is within the predetermined reference distance ($d_s$).

After a time $\Delta t1$ has elapsed from the time $T_1$ at which the counterpart ion I was present in the state of being adsorbed to the first object atom (A1), in a state in which the distance ($d_{T1}u+t$) between the first target atom A1 and the counterpart ion I exceeds the reference distance ($d_s$) and is present within the predetermined cutoff distance ($d_c$), that is, in case where the counterpart ion I is present in a state of being eliminated from the first target atom Q1 (state ($S_{a1}$)), or in a state in which both the distance ($d_{T1+t}$) between the first target atom A1 and the counterpart ion I and the distance ($d_{T1+\Delta t1}$) between the second target atom A2 which is electrically charged and present on the skeleton of the second polymer P2 forming the electrolyte membrane and the counterpart ion I are present within the reference distance ($d_s$), that is, in case where the counterpart ion I is in a state of being adsorbed to all the second target atoms A2 present at a distance very close to the first target atom A1 (state ($S_{a2}$)), an identification number ($N_{P1}$) of the first polymer P1 where the first target atom A1 to which the counterpart ion I is adsorbed is present in the skeleton is collected at the time of $T_1$.

The time of $T_1+\Delta t1$ refers to a time after a time corresponding to $\Delta t1$ has lapsed from the time of $T_1$. The $\Delta t1$ may be set without a limitation as long as it is a time interval by which the counterpart ion I may cause a change of a state in a relationship with the first counterpart atom A1 in a molecular dynamics simulation, and is preferably, 0.1 to 500 picoseconds, more preferably, 0.1 to 100 picoseconds.

Second Collecting Module 112

In case where a distance ($d_{T2}$) between the first target atom A1 and the counterpart ion I exceeds the reference distance ($d_s$) and is present within the predetermined cutoff distance ($d_c$) (state ($S_{b1}$)) or in case where both the distance ($d_{T2}$) between the first target atom A1 and the counterpart ion I and the distance ($d_{T2}$) between the second target atom A2 and the counterpart ion I are present within the reference distance ($d_s$) (state ($S_{b2}$)), from the time of $T_1+\Delta t1$ to the time of $T_2$, and also, in case where a distance ($d_{T2}+t$) between the second target atom A2 and the counterpart ion I is present within the reference distance ($d_s$) at the time of $T_2+\Delta t2$, the second collecting module 112 collects an identification number ($N_{P2}$) given to the second polymer P2 including the second target atom A2.

From the time of $T_1+\Delta t1$ to the time of $T_2$, the counterpart ion I may be present in a state of being eliminated from the first target atom A1.

In this manner, until the time of $T_2$, which is a time after the counterpart ion I present in a state of being adsorbed to the first object atom (A1) at the time of $T_1$ is present in a state of being eliminated from the first target atom A1 until the time of $T_2$, which is a time after the time of about 2t has passed, and in case where the counterpart ion I is adsorbed to the second target atom at the time of $T_2+\Delta t2$, it may be predicted that intra-movement of inter-movement of the counterpart ion I has occurred due to the one time of desorption.

Also, at the time of $T_1+\Delta t1$, the counterpart ion I may be present in a state of being adsorbed to both the first target atom A1 and the second target atom A2 present at a very close distance to the first target atom A1.

In this manner, the counterpart ion I present in a state of being adsorbed to the first target atom A1 at the time of $T_1$ is present in a state of being adsorbed to the first target atom A1 and the second target atom A2 until the time of $T_2$, which is a time after the time of about 2t has passed, and in case where the counterpart ion I is adsorbed to the second target atom at the time of $T_2+\Delta t2$, it may be predicted that the counterpart ion I has moved to the second target atom A2 very close to the first target atom A1, that is, an intra-movement has occurred.

In the method of evaluating a movement tendency of ions in the electrolyte membrane of the present disclosure, the first target atom A1 and the counterpart ion I are present in a state of being adsorbed at the time of $T_1$, and after the time of $\Delta t1$ has passed from the time of $T_1$, the counterpart ion I is eliminated from the first target atom A1 or adsorbed to the first target atom A1 and the second target atom A2, and after this state continues to the time of $T_2$, the counterpart ion I is adsorbed to the second target atom A2 at the time of $T_2+\Delta t2$. During this process, each identification number ($N_p$) given to the polymers P to which the counterpart ion I is adsorbed according to the passage of time from the time of $T_1$ to the time of $T_2+\Delta t2$ may be identified, thereby screening a movement tendency of the counterpart ion I according to the passage of time.

The time of $T_2$ refers to a time after a sufficient time for causing the counterpart ion I to move has passed from the time of $T_1+\Delta t1$ at which the counterpart ion I is present in a state of being eliminated, and the time of $T_2+\Delta t2$ refers to a time after the time corresponding to $\Delta t2$ has passed from the time of $T_2$. The $\Delta t2$ may be set without a limitation as long as it is a time interval by which the counterpart ion I may cause a change of a state in a relationship with the second counterpart atom A2 in a molecular dynamics simulation, and is preferably, 0.1 to 500 picoseconds, and more preferably, 0.1 to 100 picoseconds.

The distance ($d_{T1}$), the distance ($d_{T1+\Delta t1}$), the distance $d_{T2}$, and the distance ($d_{T2+\Delta t2}$) in the first collecting module and the second collecting module may be calculated through position information of the first target atom A1 or the second target atom A2, and the counterpart ion I at every time frame (unit time) of $T_1$, $T_1+\Delta t1$, $T_2$, and $T_2+\Delta t2$ using a molecular dynamics simulation.

In the case of using the molecular dynamics simulation, values corresponding to positions of the target atom A present in a state of being electrically charged on the skeleton of the polymers P forming the electrolyte membrane according to time and the counterpart ion I present outside the electrolyte membrane may be calculated. Thus, the distance ($d_T$) to the counterpart ion I present outside the electrolyte membrane may be determined with respect to the target atom A present in a state of being electrically charged on the skeleton of the polymers P forming the electrolyte membrane using the position values of the target atom A and the counterpart ion I calculated through the molecular dynamics simulation.

The reference distance $d_s$ in the first collecting module and the second collecting module refers to the sum of a van der Waals distance between the target atom A and the counterpart ion I and a vibration distance of each of the target atom A and the counterpart ion I, and the cutoff distance ($d_c$) refers to a distance between the target atom A present in a state of being electrically charged on the skeleton of the polymer P forming the electrolyte membrane and another homogeneous target atom A present in a state of being electrically charged on the skeleton of the same polymer P as that of the target atom A.

Determining Module 113

The determining module 113 determines whether the identification number $N_{P1}$ and the identification number $N_{P2}$ are the same.

In this manner, the identification number $N_p$ given to the polymer P to which the counterpart ion I is adsorbed is identified according to the passage of time from the time of $T_1$ to the time of $T_2+\Delta t2$ and it is determined whether the collected identification number $N_{P1}$ and the identification number $N_{P1}$ are the same, thereby evaluating a movement tendency of the counterpart ion I according to the passage of time.

Specifically, when the identification number $N_{P1}$ and the identification number $N_{P2}$ are different, the first polymer P1 where the first target atom A1 as a target of adsorption occurring at the time of $T_1$ is present and the second polymer P2 where the second target atom A2 as a target of adsorption occurring at the time of $T_2+\Delta t2$ are different, and in this case, it may be evaluated that an inter-movement, which is a movement between the first polymer P1 and the second polymer P2, has occurred.

Also, in case where the identification number $N_{P1}$ and the identification number $N_{P2}$ are the same, the first polymer P1 where the first target atom A1 as a target of adsorption occurring at the time of $T_1$ is present and the second polymer P2 where the second target atom A2 as a target of adsorption occurring at the time of $T_2+\Delta t2$ are the same or the first target atom A1 and the second target atom A2 are the same, and in this case, it may be evaluated that an intra-movement, which is a movement in the first polymer P1, has occurred.

Adding Module 114

The adding module 114 may add up or count the numbers of the counterpart ions in case where the identification number $N_{P1}$ and the identification number $N_{P2}$ are different or add up or count the numbers of the counterpart ions I in case where the identification number $N_{P1}$ and the identification number $N_{P2}$ are the same.

First Calculating Module 115 and Second Calculating Module 116

The processor 110 may further include a first calculating module 115.

The first calculating module 115 calculates the sum of the numbers of counterpart ions I in case where the identification number $N_{P1}$ and the identification number $N_{P2}$ are different, as a result of a movement tendency between polymers.

The processor 110 may further include a second calculating module 116.

The second calculating module 116 calculates the sum of the numbers of counterpart ions (I) in case where the identification number $N_{P1}$ and the identification number $N_{P2}$ are the same, as a result of a movement tendency in a polymer.

The processor 110 may further include the first calculating module 115 and the second calculating module 116.

The first calculating module calculates a value having a valid ion movement tendency may be calculated by dividing the sum of the counterpart ions I in case where the identification number $N_{P1}$ and the identification number $N_{P2}$ are different by the number of the counterpart ions I in case where the identification number $N_{P1}$ and the identification number $N_{P2}$ are different and the number of counterpart ions I in case where the identification number $N_{P1}$ and the identification number $N_{P2}$ are the same.

The second calculating module calculates a value having a valid ion movement tendency may be calculated by dividing the sum of the counterpart ions I in case where the identification number $N_{P1}$ and the identification number $N_{P2}$ are the same by the number of the counterpart ions I in case where the identification number $N_{P1}$ and the identification number $N_{P2}$ are different and the number of counterpart ions I in case where the identification number $N_{P1}$ and the identification number $N_{P2}$ are the same.

The memory 120 includes a read only memory (ROM) 121 and a random access memory (RAM) 122 and may store a program for operating the processor or may temporarily store input/output data.

The input device 130 generates data according to a user's operation. The input device may be realized as a user interface by a keypad, a touch pad, a jog switch, and the like.

The output device 140 may output various data generated according to an operation of the apparatus for evaluating a movement tendency of ions in the electrolyte membrane. The output device may be configured as an output means such as a display, a speaker, and the like.

The storage 150 includes various types of volatile or non-volatile storage medium such as the memory. The storage may be realized as a web storage that performs a storage function of a memory on the Internet.

The network interface 160 enables wired/wireless communication with another terminal through a network. The network interface 160 may be a communication technology such as the wireless Internet, mobile communication, short-range communication, and the like.

In the case of evaluating a movement tendency of ions using the method and apparatus for evaluating a movement tendency of ions in the electrolyte membrane according to the present disclosure, since the structure of the electrolyte membrane in which the ratios of intra-movement and inter-movement are each maximized is predicted through measurement of the ratios of the intra-movement and inter-movement of ions, ohmic resistance that may occur in a membrane electrode assembly (MEA) may be reduced. Furthermore, in the case of using the electrolyte membrane having the optimal structure predicted by the present disclosure, performance of a fuel cell may be significantly improved.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Hereinabove, although embodiments have been described with reference to the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method of evaluating a movement tendency of ions in an electrolyte membrane, the method comprising:
    collecting an identification number ($N_{P1}$) given to a first polymer (P1) including a first target atom (A1), if condition 1 is satisfied and one of condition 2a and condition 2b is also satisfied:
        (condition 1) at the time of $T_1$, a distance ($d_{T1}$) between the first target atom (A1) which is electrically charged and present on a skeleton of the first polymer (P1) forming an electrolyte membrane and a counterpart ion (I) which has electric charges opposite to the target atom and present outside the polymer is within a predetermined reference distance ($d_s$),
        (condition 2a) at the time of $T_1+\Delta t1$, a distance ($d_{T1+\Delta t1}$) between the first target atom (A1) and the counterpart ion (I) exceeds the reference distance ($d_s$) and is within a predetermined cutoff distance ($d_c$),
        (condition 2b) at the time of $T_1+\Delta t1$, both the distance ($d_{T1+\Delta t1}$) between the first target atom (A1) and the counterpart ion (I) and the distance ($d_{T1+\Delta t1}$) between a second target atom (A2) which is electrically charged and present on a skeleton of the second polymer (P2) forming the electrolyte membrane and the counterpart ion (I) are within the reference distance ($d_s$);
    collecting an identification number ($N_{P2}$) given to the second polymer P2 including a second target atom A2, if condition 3a or condition 3b is satisfied, and condition 4 is also satisfied:
        (condition 3a) from the time of $T_1+\Delta t1$ to the time of $T_2$, a distance ($d_{T2}$) between the first target atom (A1) and the counterpart ion (I) exceeds the reference distance ($d_s$) and is present within the predetermined cutoff distance ($d_c$),
        (condition 3b) from the time of $T_1+\Delta t1$ to the time of $T_2$, both the distance ($d_{T2}$) between the first target atom (A1) and the counterpart ion (I) and the distance ($d_{T2}$) between the second target atom (A2) and the counterpart ion (I) are present within the reference distance ($d_s$),
        (condition 4) at the time of $T_2+\Delta t2$, a distance ($d_{T2+\Delta t2}$) between the second target atom (A2) and the counterpart ion (I) is present within the reference distance ($d_s$);
    determining whether the identification number ($N_{P1}$) of the first polymer (P1) and the identification number ($N_{P2}$) of the second polymer (P2) are the same; and
    counting the number of the counterpart ions (I) when the identification number ($N_{P1}$) and the identification number ($N_{P2}$) are different or counting the number of the counterpart ions (I) when the identification number ($N_{P1}$) and the identification number ($N_{P2}$) are the same.

2. The method according to claim 1, wherein $\Delta t1$ and $\Delta t2$ are 0.1 to 500 picoseconds.

3. The method according to claim 1, wherein the first polymer P1 and the second polymer P2 each include a fluororesin or a hydrocarbon resin terminated with a negative charge function group containing the first target atom A1 and a negative charge function group containing the second target atom A2.

4. The method according to claim 3, wherein the fluororesin includes a copolymer including repeat units derived from tetrafluoroethylene and repeat units derived from perfluorinated vinyl ether.

5. The method according to claim 3, wherein the hydrocarbon resin includes any one selected from the group consisting of a polystyrene-based resin, a polyarylene ether-based resin, and a polypenylene-based resin.

6. The method according to claim 3, wherein the negative charge function group containing the first target atom A1 and the negative charge function group containing the second target atom A2 each are a sulfonic acid group containing a sulfur atom.

7. The method according to claim 1, wherein the counterpart ion I is a hydronium ion.

8. The method according to claim 1, wherein the distance ($d_{T1}$), the distance ($d_{T1+\Delta t1}$), the distance ($d_{T2}$), and the distance ($d_{T2+\Delta t2}$) are calculated through position information of the target atom and the counterpart ion in the time frame of $T_1$, $T_1+\Delta t1$, $T_2$, and $T_2+\Delta t2$ using a molecular dynamics simulation.

9. The method according to claim 1, wherein the reference distance ($d_s$) is the sum of a van der Waals distance between the target atom A and the counterpart ion I and a vibration distance of each of the target atom A and the counterpart ion I.

10. The method according to claim 1, wherein the cutoff distance ($d_c$) is a distance between the target atom and another homogeneous atom which has the same electric charges as those of the target atom and is present.

11. The method according to claim 1, further comprising:
    calculating the sum of the numbers of counterpart ions (I) in case where the identification number $N_{P1}$ and the identification number $N_{P2}$ are different as a result of a movement tendency between polymers.

12. The method according to claim 1, further comprising:
    calculating the sum of the numbers of counterpart ions (I) in case where the identification number $N_{P1}$ and the identification number $N_{P2}$ are the same as a result of a movement tendency in a polymer.

13. The method according to claim 11, wherein, in the calculation, a value having a valid ion movement tendency is calculated by dividing the sum of the counterpart ions I in case where the identification number $N_{P1}$ and the identification number $N_{P2}$ are different by the number of the counterpart ions I in case where the identification number $N_{P1}$ and the identification number $N_{P2}$ are different and the number of counterpart ions I in case where the identification number $N_{P1}$ and the identification number $N_{P2}$ are the same.

14. The method according to claim 12, wherein, in the calculation, a value having a valid ion movement tendency is calculated by dividing the sum of the counterpart ions I in case where the identification number $N_{P1}$ and the identification number $N_{P2}$ are the same by the number of the counterpart ions I in case where the identification number $N_{P1}$ and the identification number $N_{P2}$ are different and the number of counterpart ions I in case where the identification number $N_{P1}$ and the identification number $N_{P2}$ are the same.

* * * * *